United States Patent
Banerjee et al.

(10) Patent No.: US 7,133,894 B2
(45) Date of Patent: Nov. 7, 2006

(54) METHOD, APPARATUS, AND PROGRAM FOR SYNCHRONOUS REMOTE BUILDS

(75) Inventors: Mahadev Banerjee, Raleigh, NC (US); Timothy S. Orlowski, Hillsborough, NC (US)

(73) Assignee: International Business Machines Corporation, Armonk, NY (US)

( * ) Notice: Subject to any disclaimer, the term of this patent is extended or adjusted under 35 U.S.C. 154(b) by 744 days.

(21) Appl. No.: 10/095,652

(22) Filed: Mar. 12, 2002

(65) Prior Publication Data

US 2003/0177473 A1    Sep. 18, 2003

(51) Int. Cl.
*G06F 15/16* (2006.01)

(52) U.S. Cl. .................... 709/203; 709/217; 709/219; 717/101; 717/103; 717/106; 717/174; 717/175; 717/176

(58) Field of Classification Search ............... None
See application file for complete search history.

(56) References Cited

U.S. PATENT DOCUMENTS

| | | | |
|---|---|---|---|
| 4,951,192 A * | 8/1990 | Chase et al. | 717/149 |
| 5,220,654 A | 6/1993 | Benson et al. | 395/275 |
| 5,428,782 A | 6/1995 | White | 395/650 |
| 5,442,791 A * | 8/1995 | Wrabetz et al. | 719/330 |
| 5,560,013 A | 9/1996 | Scalzi et al. | 395/700 |
| 5,574,898 A * | 11/1996 | Leblang et al. | 707/1 |
| 5,655,146 A | 8/1997 | Baum et al. | 395/825 |
| 5,694,601 A | 12/1997 | White | 395/671 |
| 5,754,845 A | 5/1998 | White | 395/610 |
| 5,758,160 A | 5/1998 | McInerney et al. | 395/701 |
| 5,812,854 A | 9/1998 | Steinmetz et al. | 395/709 |
| 5,889,990 A | 3/1999 | Coleman et al. | 395/682 |
| 5,974,563 A | 10/1999 | Beeler, Jr. | 714/5 |
| 6,049,822 A | 4/2000 | Mittal | 709/217 |
| 6,158,047 A | 12/2000 | Le et al. | 717/5 |
| 6,178,546 B1 * | 1/2001 | McIntyre | 717/115 |
| 6,195,795 B1 * | 2/2001 | Block et al. | 717/101 |
| 6,237,136 B1 | 5/2001 | Sadahiro | 717/2 |
| 6,252,591 B1 | 6/2001 | Dockweiler et al. | 345/335 |
| 6,324,582 B1 * | 11/2001 | Sridhar et al. | 709/230 |
| 6,457,170 B1 * | 9/2002 | Boehm et al. | 717/106 |
| 6,487,713 B1 * | 11/2002 | Cohen et al. | 717/105 |
| 6,549,936 B1 * | 4/2003 | Hirabayashi | 709/205 |
| 6,678,731 B1 * | 1/2004 | Howard et al. | 709/225 |
| 6,728,884 B1 * | 4/2004 | Lim | 713/201 |

(Continued)

FOREIGN PATENT DOCUMENTS

EP    1046989 A2 *    10/2000

(Continued)

OTHER PUBLICATIONS

S. I. Feldman,Make—A Program for Maintaining Computer Programs (1986) Bell Laboratories Murray Hill, New Jersey 07974 http://ml.ist.utl.pt/~prs/unix/make.ps.*

(Continued)

*Primary Examiner*—Bunjob Jaroenchonwanit
*Assistant Examiner*—Dohm Chankong
(74) *Attorney, Agent, or Firm*—Yee and Associates

(57) ABSTRACT

A client/server application is provided for performing synchronous builds on a server. The client, running on a development platform, communicates with the server and, together, they complete a build transaction. In a build transaction, the client transfers all the resources that are needed for the build to the server. The server completes the build and returns any resulting output resources to the client. The end user invokes the client for each build transaction and such calls may be embedded in a script facilitating automation of the overall build process.

32 Claims, 5 Drawing Sheets

U.S. PATENT DOCUMENTS

| | | | |
|---|---|---|---|
| 2003/0145049 A1* | 7/2003 | Hirabayashi | 709/203 |
| 2003/0145306 A1* | 7/2003 | Melahn et al. | 717/101 |
| 2004/0083450 A1* | 4/2004 | Porkka | 717/103 |

FOREIGN PATENT DOCUMENTS

| | | |
|---|---|---|
| EP | 1265150 A1 * | 12/2002 |

OTHER PUBLICATIONS

Andrew Oram, Steve Talbott, Managing Projects With Make, Sep. 1, 1991, O'Reilly, ISBN 0937175900.*

Douglas Compbell, Chris Grevstad, A tutorial for make, Proceedings of the 1985 ACM annual conference on The range of computing : mid-80's perspective (1985), ACM Press New York, NY, USA, pp. 374-380.*

"How to Run make", Feb. 28, 2001, www.sunsite.ualberta.ca/Documentation/Gnu/make-3.79/html_chapter/make_9.html, p. 1-9.*

"Setting up a Distributed Build", Jul. 21, 1995, techpubs.sgi.com/library/tpl/cgi-bin/getdoc.cgi/0630/bks/SGI_EndUser/books/CirC_UG/sgi_html/ch13.html, pp. 1-6.*

"Configuring Rake Builder-Build success condition", luntbuild.javaforge.com/manual/guide/ch12s05.html, pp. 1-2.*

IBM Technical Disclosure Bulletin, "Automated Software Product Inventory Control", vol. 37, No. 12, Dec. 1994, pp. 481-484.

IBM Technical Disclosure Bulletin, "Verifying Object Ownership Between Development and Production Environments", vol. 37, No. 12, Dec. 1994, pp. 267-269.

Friedland, J., Digest of Papers. COMPCON Spring 1992. Thirty-Seventh IEEE Computer Society International Conference (Cat. No. 92CH3098-1), p. 490-5, abstract.

Frazier, G.F., "Porting C++ Code from NT to UNIX", Dr. Dobb's Journal, vol. 24, No. 4, p. 84, 86-9, abstract.

* cited by examiner

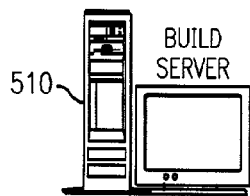
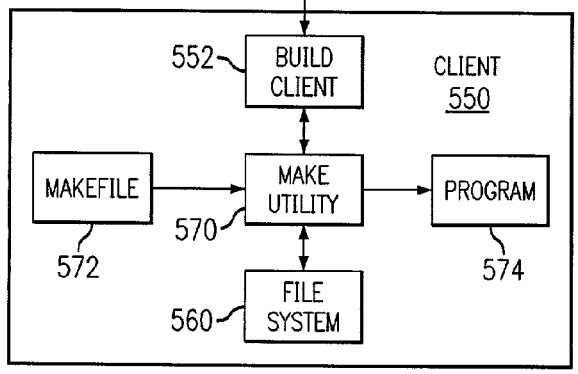
FIG. 5
FIG. 6

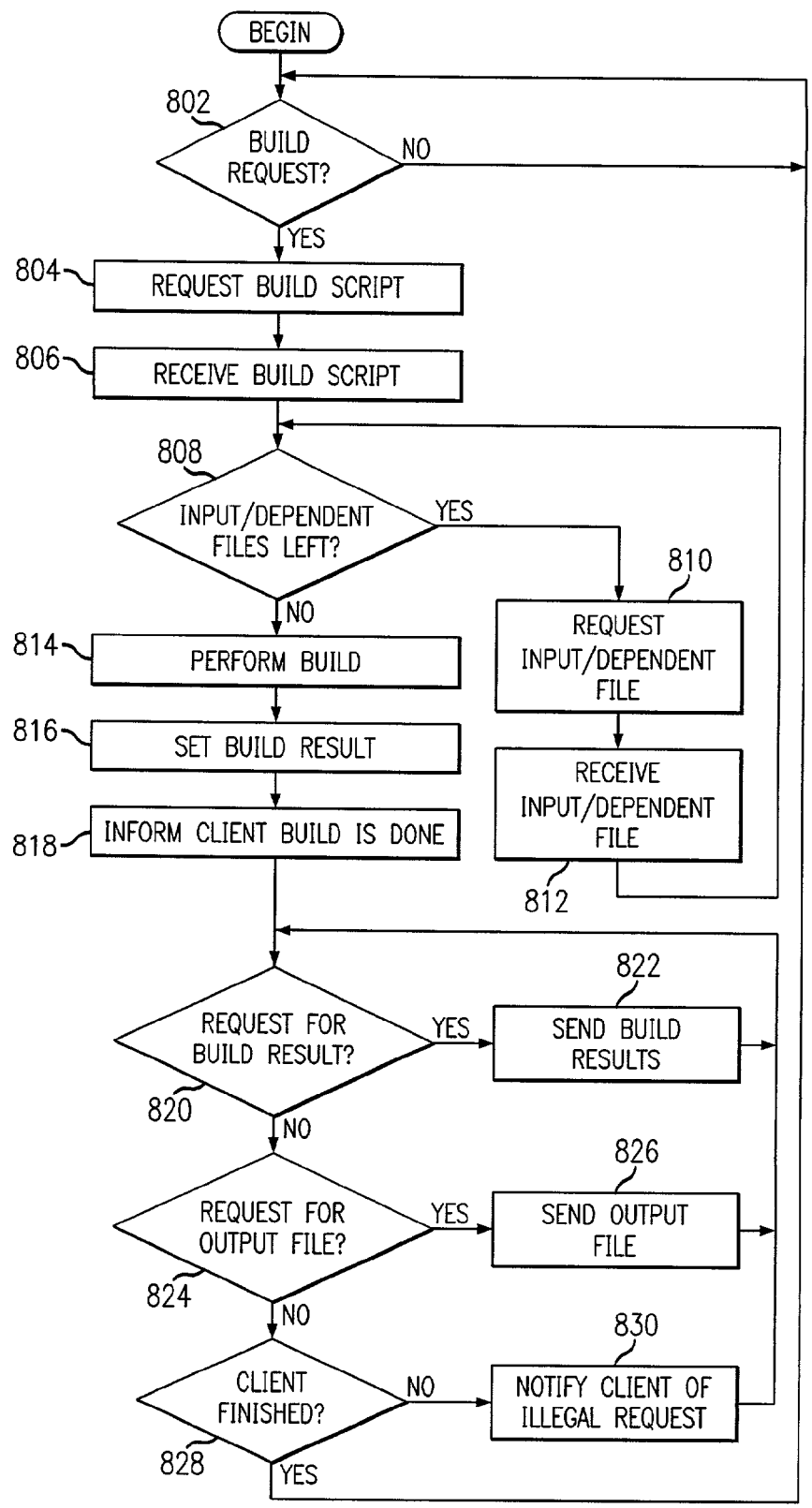

US 7,133,894 B2

METHOD, APPARATUS, AND PROGRAM FOR SYNCHRONOUS REMOTE BUILDS

BACKGROUND OF THE INVENTION

1. Technical Field

The present invention relates to data processing and, in particular, to performing application builds on a server. Still more particularly, the present invention provides a method, apparatus, and program for performing synchronous builds on a server.

2. Description of Related Art

Server software is typically developed by programmers at a client workstation. Thus, a programmer may develop this software using a source repository and development environment that is different from the target of the software. After developing source code, the application must be built on the target platform.

Typically, a "build" process then converts a set of input files to a set of output files on the target platform using a transformation rule called the build script. As a simple example, a set of input files could be COBOL source, the build script could invoke a COBOL compiler on the server, and the output could be the files created by the compiler. After the build is successfully completed, the developer may retrieve the output from the server and store the output files in the repository of the development platform, perhaps as input to a subsequent build.

Consequently, the developer must transform the input files to the target platform using file transfer protocol (FTP) or another file transfer utility. Then, the developer must invoke the build script. The build script is the prescription for transforming the input into the output. The build script may take the form of a command file or a job in a job control language (JCL) stream. JCL is a command language for mini and mainframe operating systems that launches applications. JCL specifies priority, program size, and running sequence, as well as the files and databases used. To invoke the build script, the user could use the network job entry (NJE) protocol or another tool.

The user must then determine the result of the execution of the build script. In other words, the user must determine whether the build completed and whether or not the build script executed successfully. If the build script execution is successful and the output needs to be retrieved from the server, then the developer must transfer the output files from the server, again using FTP or another file transfer utility.

This process for performing builds on a target platform is inconvenient and prone to errors. There are products that allow a user to do a remote edit on a workstation platform, but the file resources are still stored in the server environment. They allow a build to be started from the workstation, but they require the user to monitor a job queue to determine the results of the build. These solutions are usually proprietary to the specific tool or product.

Therefore, it would be advantageous to provide a single, seamless process for defining inputs, outputs, and build scripts to perform a synchronous build on a server.

SUMMARY OF THE INVENTION

The present invention provides a client/server application for performing synchronous builds on a server. The client, running on a development platform, communicates with the server and, together, they complete a build transaction. In a build transaction, the client transfers all the resources that are needed for the build to the server. The server completes the build and returns any resulting output resources to the client. The end user invokes the client for each build transaction and such calls may be embedded in a script facilitating automation of the overall build process. The present invention allows the user to perform development and the build process solely from the development platform.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 5 is a block diagram of an exemplary client/server system for performing synchronous builds using a make utility in accordance with a preferred embodiment of the present invention;

FIG. 6 is a data flow diagram of an exemplary synchronous remote build in accordance with a preferred embodiment of the present invention;

FIG. 8 is a flowchart illustrating the operation of a build server in accordance with a preferred embodiment of the present invention.

DETAILED DESCRIPTION OF THE PREFERRED EMBODIMENT

Figure 1:
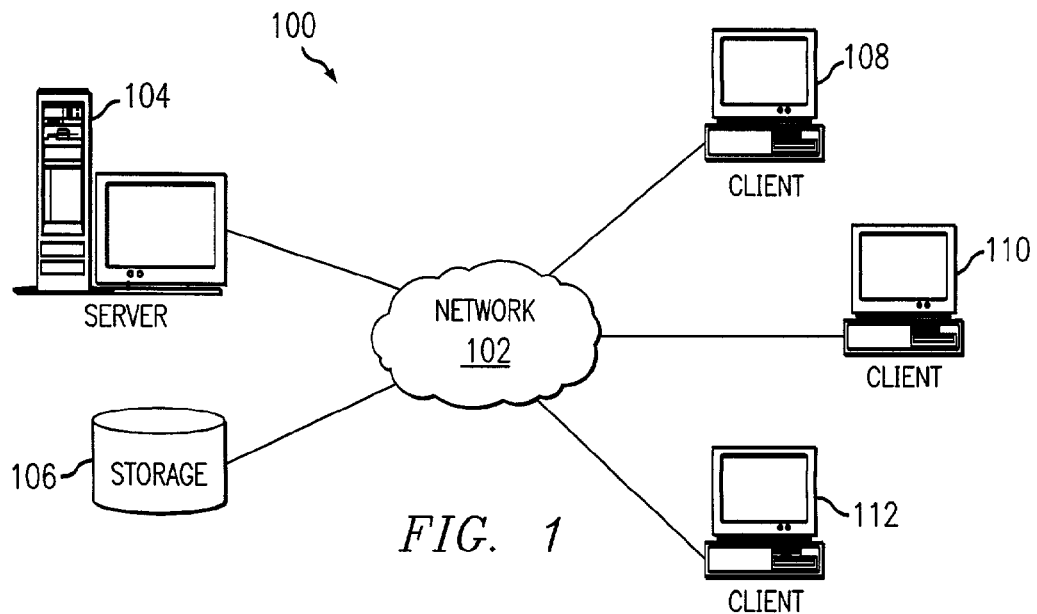
FIG. 1 depicts a pictorial representation of a network of data processing systems in which the present invention may be implemented.

With reference now to the figures, FIG. 1 depicts a pictorial representation of a network of data processing systems in which the present invention may be implemented. Network data processing system 100 is a network of computers in which the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, server 104 is connected to network 102 along with storage unit 106. In addition, clients 108, 110, and 112 are connected to network 102. These clients 108, 110, and 112 may be, for example, personal computers or network computers. In the depicted example, server 104 provides data, such as boot files, operating system images, and applications to clients 108–112. Clients 108, 110, and 112 are clients to server 104. Network data processing system 100 may include additional servers, clients, and other devices not shown.

In the depicted example, network data processing system 100 is the Internet with network 102 representing a worldwide collection of networks and gateways that use the TCP/IP suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the present invention.

In accordance with a preferred embodiment of the present invention, a client/server application is provided for performing synchronous builds on a server. The build client, running on a development platform, such as one of clients 108, 110, 112, communicates with the build server, running on server 104. Together, the build client and the build server complete a build transaction. In a build transaction, the client transfers all the resources that are needed for the build to the server. The server completes the build and returns any resulting output resources to the client. The end user invokes the client for each build transaction and such calls may be embedded in a script facilitating automation of the overall build process. The present invention allows the user to perform development and the build process solely from the development platform.

Figure 2:
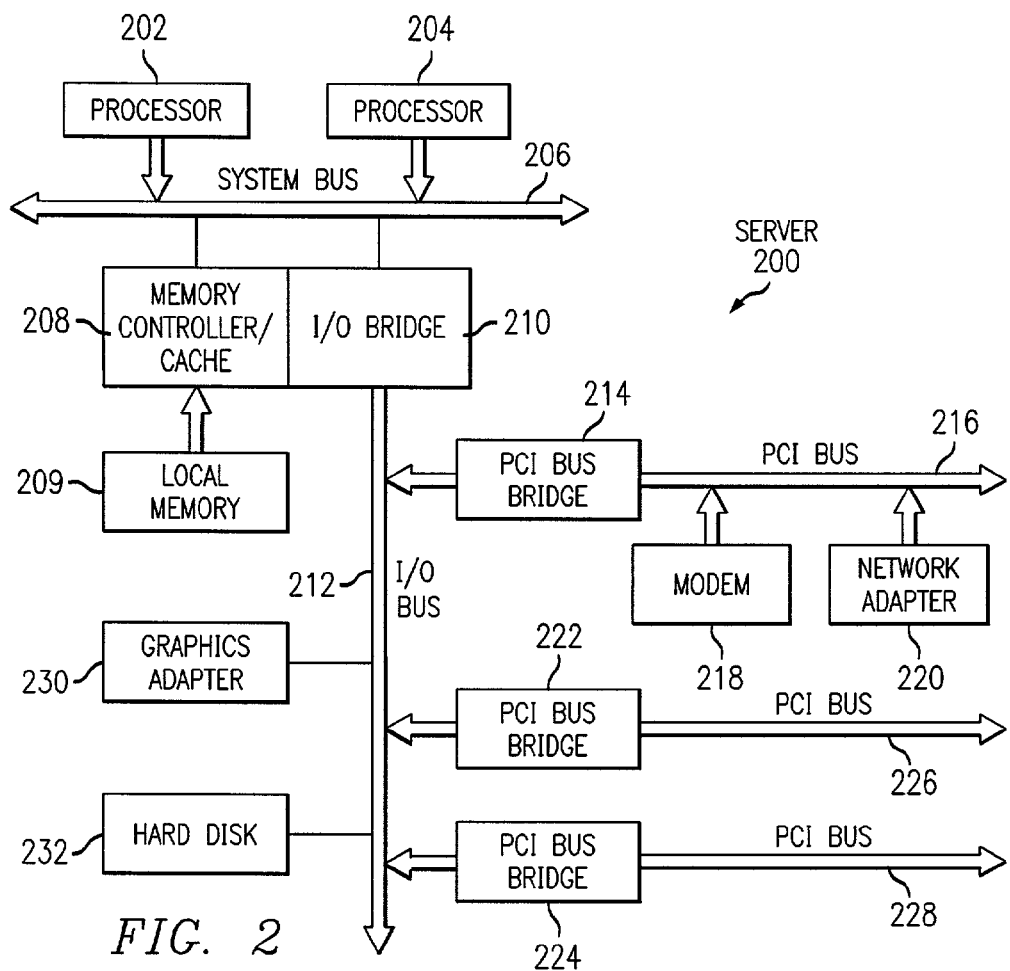
FIG. 2 is a block diagram of a data processing system that may be implemented as a server in accordance with a preferred embodiment of the present invention.

Referring to FIG. 2, a block diagram of a data processing system that may be implemented as a server, such as server 104 in FIG. 1, is depicted in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI local bus 216. Typical PCI bus implementations will support four PCI expansion slots or add-in connectors. Communications links to clients 108–112 in FIG. 1 may be provided through modem 218 and network adapter 220 connected to PCI local bus 216 through add-in boards.

Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention. The data processing system depicted in FIG. 2 may be, for example, an IBM e-Server pSeries system, a product of International Business Machines Corporation in Armonk, N.Y., running the OS/390 or Z/OS operating system, the Advanced Interactive Executive (AIX) operating system, or LINUX operating system. Even though the present invention applies to all server platforms, it is particularly suited for the 390/MVS environment where there is no simple method of performing remote, synchronous builds.

Figure 3:
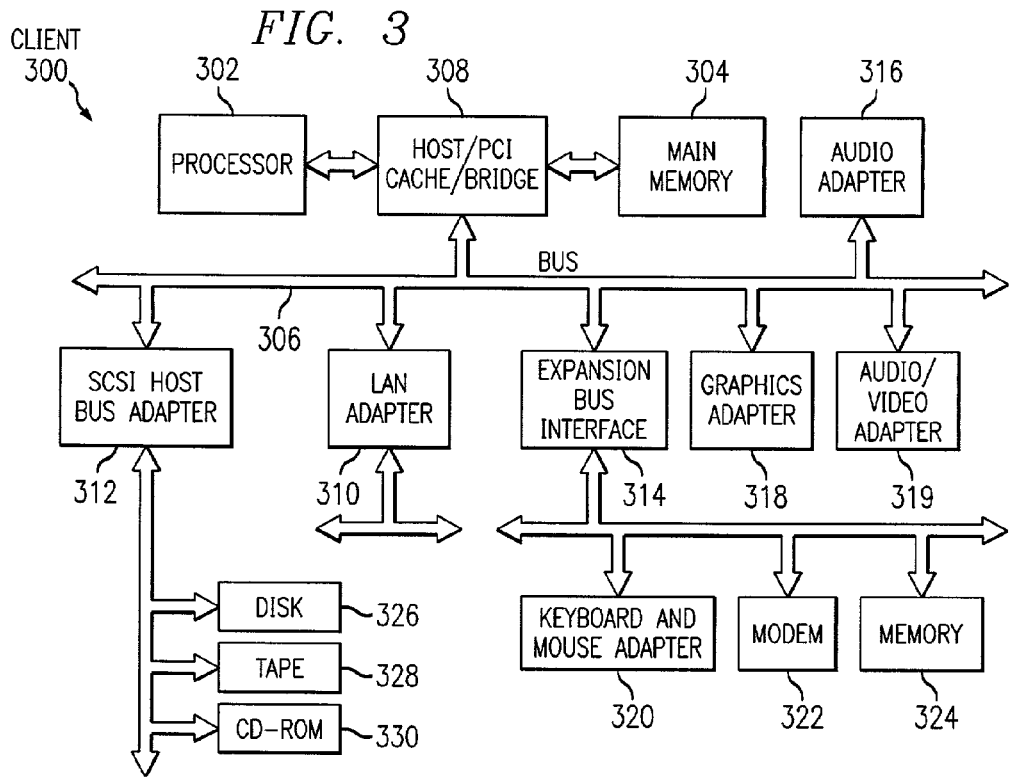
FIG. 3 is a block diagram illustrating a data processing system in which the present invention may be implemented.

With reference now to FIG. 3, a block diagram illustrating a data processing system is depicted in which the present invention may be implemented. Data processing system 300 is an example of a client computer. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards.

In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. Small computer system interface (SCSI) host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as Windows 2000, which is available from Microsoft Corporation. An object oriented programming system such as Java may run in conjunction with the operating system and provide calls to the operating system from Java programs or applications executing on data processing system 300. "Java" is a trademark of Sun Microsystems, Inc. Instructions for the operating system, the object-oriented operating system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash ROM (or equivalent nonvolatile memory) or optical disk drives and the like, may be used in addition to or in place of the hardware depicted in FIG. 3. Also, the processes of the present invention may be applied to a multiprocessor data processing system.

As another example, data processing system 300 may be a stand-alone system configured to be bootable without relying on some type of network communication interface, whether or not data processing system 300 comprises some type of network communication interface. As a further example, data processing system 300 may be a personal digital assistant (PDA) device, which is configured with ROM and/or flash ROM in order to provide non-volatile memory for storing operating system files and/or user-generated data.

The depicted example in FIG. 3 and above-described examples are not meant to imply architectural limitations. For example, data processing system 300 also may be a notebook computer or hand held computer in addition to taking the form of a PDA. Data processing system 300 also may be a kiosk or a Web appliance.

Figure 4:
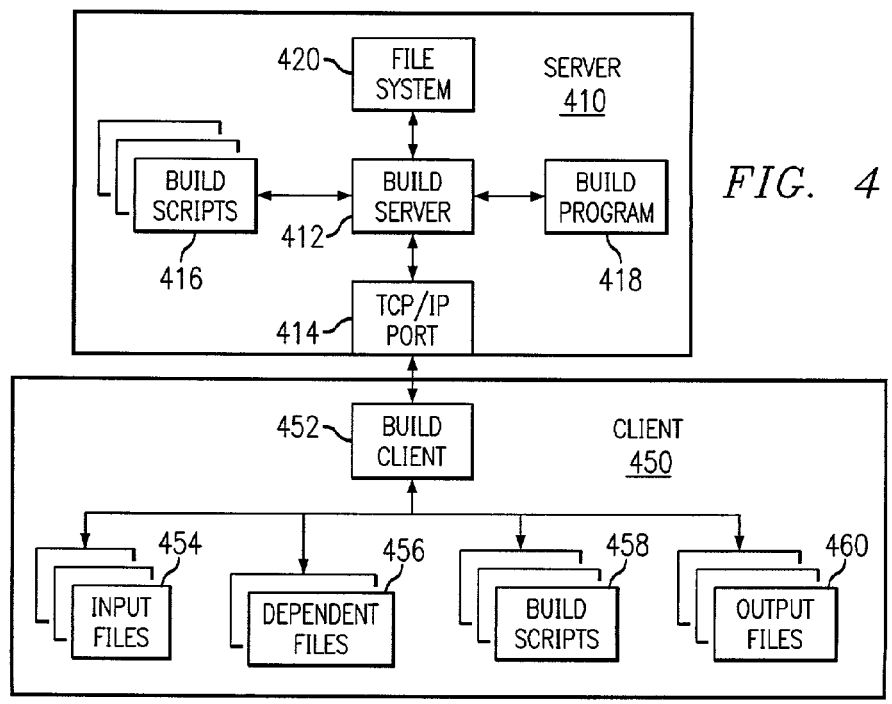
FIG. 4 is a block diagram of an exemplary client/server system for performing synchronous builds in accordance with a preferred embodiment of the present invention.

With reference to FIG. 4, a block diagram of an exemplary client/server system for performing synchronous builds is shown in accordance with a preferred embodiment of the present invention. Server 410 is connected to client 450. Server 410 may be, for example, server 104 and client 450 may be, for example, one of clients 108, 110, 112 in FIG. 1 connected through network 102.

Server 410 includes build server 412, which may be an executable load module that is invoked as a batch program or started task. The build server listens to a communications port, such as Transmission Control Protocol/Internet Protocol (TCP/IP) port 414, waiting for client requests for builds to be performed. Build server 412 performs the builds as defined in the build requests using build program 418 and files in file system 420.

Build scripts 416 provide the recipe for a build and may be contained in file system 420. The build scripts may be referenced in a build request or, alternatively, may be sent from the client. Server 410 must also provide a scripting language for the build scripts to be executed on a batch processing operating system, such as Multiple Virtual Storage (MVS). The build script may simply be a text file that is similar to Job Control Language (JCL).

The build server may be invoked as follows:
build_server -p <portno> where:
 <portno> is a user supplied TCP/IP port at which the server listens.

Client 450 includes build client 452, which is a program running on the development platform. The build client program is invoked once for each build transaction. It can be called as a stand-alone program or can be embedded in another tool, such as "make," as will be described below.

The build client may be invoked as follows:
build_client -h <host@port>
-b <build script>
-i <input files list>
-d <dependent files list>
-o <output files list>
-p <build parameters>
-c <success condition>
-n <success return code>
-au <userid >-ap <password>
where:
 <host@port> specifies the TCP/IP address and port number of the server.
 <build script> specifies the name of the build script to be executed.
 <input files list> is the list of all the files which are input to the build. These files are transferred to the server. For example, input files may include a COBOL source file.
 <dependent files list> is the list of additional files from the client that are needed for the build. These are transferred to the server. For example, dependent files may include COBOL copy files.
 <output files list> is the list of all the output files that are results of the build. These are transferred from the server after a successful build.
 <build parameters> is the parameter string to be passed to the build script.
 <success condition> is the comparison operator, which determines, in conjunction with <success return code>, whether the build is successful. For example, if success condition is LE and success return code is 4, then if the build script finishes with a return code of 0 or 4, then the build is considered to be successful.
 <userid> and <password> are the user identification (ID) and password under which the build script is to be executed.

In a specific implementation of the present invention, there are additional parameters and features that may be included and are not described here. The present invention is not meant to be exhaustive or limited to the example implementations of the build server and the build client shown here.

As a more specific example, the build client may be invoked to compile a COBOL source program, test.cbl, as follows:
build_client -h mvssystem@2600 -b COMPCOB -i test.cbl -o test.obj -c EQ -n 0
where:
 the server is running at TCP/IP host mvssystem on port 2600.
 the build script is a file called COMPCOB at the server.
 test.cbl is the only input file (on the client's file system).
 test.obj is the output file returned to the client's file system if the build is successful.
 the build is successful if the script COMPCOB returns a code equal to 0.

The client may include input files 454, dependent files 456, and build scripts 458 to be included in a build request. Output files 460 may also be stored a the client. Client 450 includes a file system (not shown) for storing input files 454, dependent files 456, build scripts 458, and/or output files 460.

Authentication of the client may be performed using Time Sharing Option (TSO) login and security may be provided using encryption or Secure Sockets Layer (SSL). TSO is software that provides interactive communications that allows a user or programmer to launch an application from a terminal and interactively work with it. SSL is a security protocol wherein the server sends its public key to the client, which the client uses to send a randomly generated secret key back to the server in order to have a secret key exchange for that session.

Turning now to FIG. 5, a block diagram of an exemplary client/server system for performing synchronous builds using a make utility is shown in accordance with a preferred embodiment of the present invention. Build server 510 is connected to client 550. Server 510 may be, for example, server 104 and client 550 may be, for example, one of clients 108, 110, 112 in FIG. 1 connected through network 102. Build server 510 may be similar to build server 410 shown in FIG. 4.

Client 550 includes build client 552 and make utility 570. Make is a utility for assembling a program from several independent software modules. Make utility 570 receives as input makefile 572. A makefile is a file of commands that are executed by the make utility. The makefile lists the program modules that are part of the project and associated libraries that must be linked. A makefile also includes special directives that enable certain modules to be compiled differently if required. The make utility may recompile only those modules that have been updated since the last compilation.

Make utility 570 invokes build client 552 to send build requests to the build server. In an alternative embodiment, make utility 570 may be modified to include build client 552. The make utility receives output files from the build server and these output files may be used as inputs to subsequent build steps as prescribed in the makefile. These steps could invoke a remote build via the build client or invoke local compilers. Ultimately, make utility 570 produces program 574 according to makefile 572.

With reference to FIG. 6, a data flow diagram of an exemplary synchronous remote build is illustrated in accordance with a preferred embodiment of the present invention. The build server is invoked and the build server waits for build requests (step 601). The build client sends a build request to the build server (step 602). Upon receipt of the build request, the build server sends a request for a build script (step 603). In response, the build client sends a build script to the build server (step 604).

Thereafter, the build server sends a request for input and dependent files (step 605) and the build client responds with the requested input and dependent files (step 606). Subsequently, the build server completes the build (step 607) and returns results and appropriate messages (step 608).

If the build is successful, the build client requests output files (step 609). The build server returns the requested output files (step 610). Then the build client terminates (step 612). The build server returns to wait for build requests (step 613).

Figure 7:
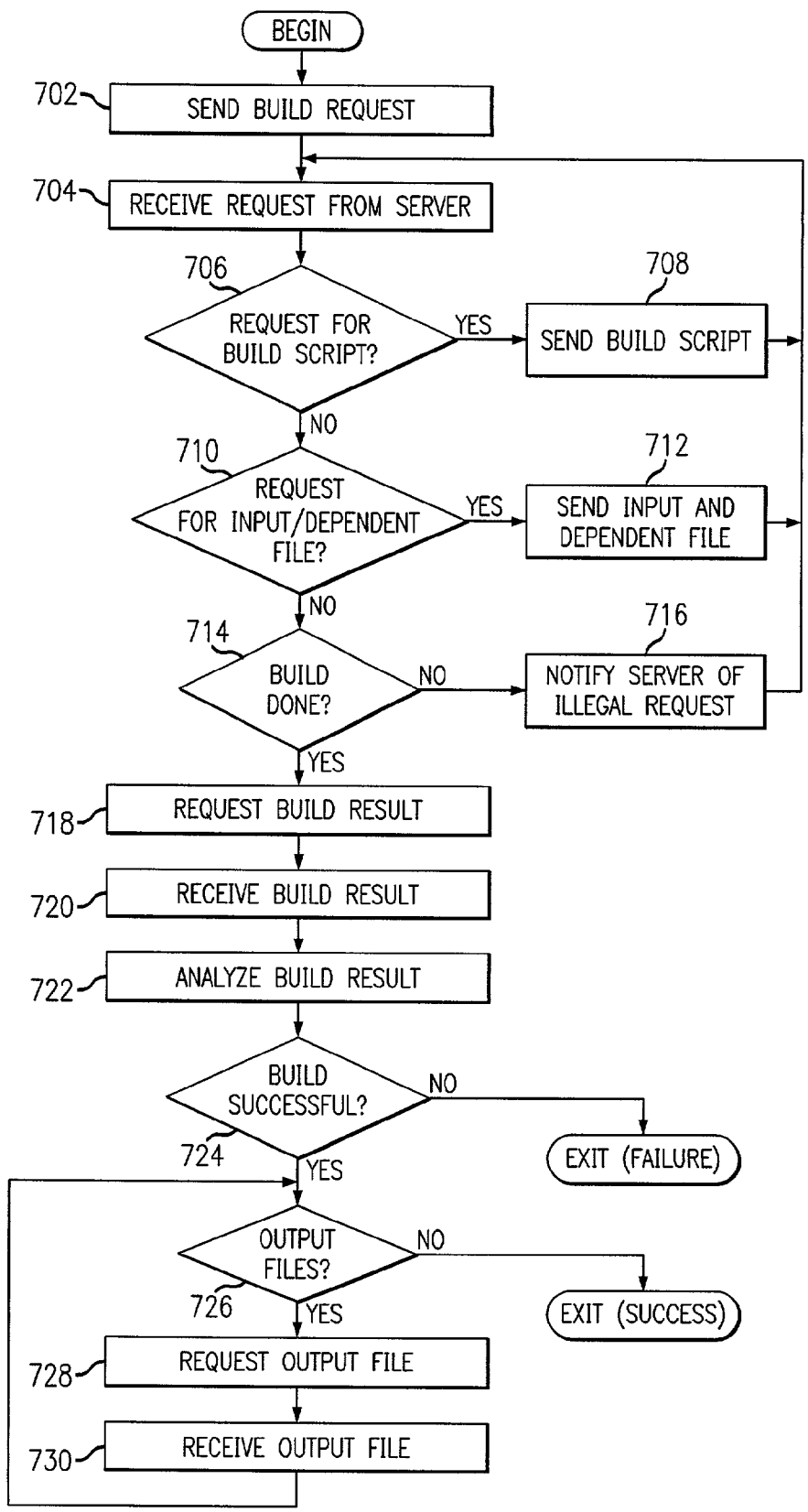
FIG. 7 is a flowchart illustrating the operation of a build client in accordance with a preferred embodiment of the present invention.

With reference now to FIG. 7, a flowchart is shown illustrating the operation of a build client in accordance with a preferred embodiment of the present invention. The process begins when the build client is invoked and the build client sends a build request to the build server (step 702). Subsequently, the process receives a request from the build server (step 704) and a determination is made as to whether the request is for a build script (step 706). If the request is for a build script, the process sends a build script to the server (step 708) and returns to step 704 to receive a request form the server.

If the request is not for a build script in step 706, a determination is made as to whether the request is for an input or dependent file (step 710). If the request is for an input or dependent file, the process sends the requested input or dependent file (step 712) and returns to step 704 to receive a request form the server.

If the request is not for an input or dependent file in step 710, a determination is made as to whether the request is an indication that the build is complete (step 714). If the build is not done, the process notifies the build server of an illegal request (step 716) and returns to step 704 to receive a request form the server. If the build is complete in step 714, the process requests a build result (step 718), receives the build result from the server (step 720), and analyzes the build result (step 722).

Thereafter, a determination is made as to whether the build is successful (step 724). If the build is not successful, the build client exits with a failure. If the build is successful in step 724, a determination is made as to whether output files must be received from the server (step 726). If there are output files to be received from the server, the process requests an output file (step 728), receives the output file from the server (step 730), and returns to step 726 to determine whether there are output files left to be received from the server. If there are no more output files to be received from the server in step 726, the build client exits with a success.

Turning now to FIG. 8, a flowchart is shown illustrating the operation of a build server in accordance with a preferred embodiment of the present invention. The process begins and a determination is made as to whether a build request is received (step 802). If a build request is not received, the process continues to monitor the port to determine whether a request is received in step 802.

If a build request is received, the process requests a build script (step 804). Then, the process receives the build script from the client (step 806) and a determination is made as to whether input and/or dependent files are left to receive from the client (step 808). If there are input and/or dependent files to be received from the client, the process requests an input or dependent file (step 810), receives the requested input or dependent file from the client (step 812) and returns to step 808 to determine whether input and/or dependent files are left to receive from the client.

If there are no input and/or dependent files left to receive from the build client in step 808, the process performs the build (step 814) according to the prescription described in the build script, sets the build result (step 816), and informs the client that the build is done (step 818). Thereafter, a determination is made as to whether a request for a build result is received from the client (step 820). If a request for a build result is received, the process sends the build results to the build client (step 822) and returns to step 820 to determine whether a request for a build result is received from the client.

Returning to step 820, if a request for a build result is not received, a determination is made as to whether a request for an output file is received from the build client (step 824). If a request for an output file is received, the process sends the requested output file to the client (step 826) and returns to step 820 to determine whether a request for a build result is received from the client.

If a request for an output file is not received from the build client in step 824, a determination is made as to whether a request indicates that the client is finished with the build (step 828). If a request indicates that the client is not finished, the process notifies the client of an illegal request (step 830) and returns to step 820 to determine whether a request for a build result is received from the client. If the client is finished in step 828, the process returns to step 802 to determine whether a new build request is received.

Thus, the present invention solves the disadvantages of the prior art by providing a client/server application for performing synchronous builds on a server. This allows a user or a tool to issue a build and receive the results from this build without having to check the job queue to determine whether the build is completed and whether the build is successful. Since the results are synchronous, tools may depend on receiving a build result code, which provides a consistent and reliable Application Program Interface (API) that can be used to simplify tools that need to do server builds from a remote workstation.

Furthermore, files may be accessed from the workstation platform, rather than having perform multiple steps to transfer files between the client and server. The synchronous remote build mechanism of the present invention is product independent. Therefore, it can be used stand-alone, in a script, in a makefile, or called by any tool that needs a mechanism for synchronous remote builds.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such a floppy disc, a hard disk drive, a RAM, and CD-ROMs and transmission-type media such as digital and analog communications links.

The description of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a client, for performing a software build remotely on a server comprising:
    sending, from a make utility on the client, under control of a makefile script, a build request to a server, wherein the build request specifies a build script file, the build request further specifies a success condition and a success return code, and wherein the build script file is executable at the server to convert a set of input files to a set of output files to form a software build;
    upon completion of the software build on the server, automatically receiving a build result from the server,
    in response to a successful software build, requesting at last one output file from the server;
    receiving the at least one output file from the server; and
    assembling, by the make utility on the client, a software program using the at least one output file based on the makefile script.

2. The method of claim 1, further comprising sending the build script file to the server in response to a request for the build script file being received from the server.

3. The method of claim 1, wherein the build script file is stored at the server.

4. The method of claim 1, wherein the build request specifies at least one input file or dependent file, the method further comprising sending the at least one input file or dependent file to the server in response to a request for the at least one input file or dependent file being received from the server.

5. The method of claim 1, wherein the build result indicates whether the software build is successful based on the success condition and the success return code.

6. The method of claim 1, wherein the build request specifies a user identification and a password, the method further comprising:
    authenticating with the server using the user identification and the password.

7. A method, in a server, for performing a synchronous build, comprising:
    receiving a build request from a client, wherein the build request specifies a build script file and wherein the build request specifies a success condition and a success return code;
    performing the build according to the build script file;
    upon completion of the build, generating a build result based on the success condition and the success return code;
    if the build is successful, generating at least one output file;
    automatically sending the build result to the client; and
    in response to a request for the at least one output file being received from the client, sending the at least one output file to the client.

8. The method of claim 7, wherein the step of receiving a build request from a client comprises:
    listening to a communication port for a build request; and
    receiving the build request through the communication port.

9. The method of claim 7, wherein the build script file resides on the client, to method further comprising:
    requesting the build script file from the client; and
    receiving the build script file from the client.

10. The method of claim 7, wherein the build script file resides on the server.

11. The method of claim 7, wherein the build request specifies at least one input file or dependent file, the method further comprising:
    requesting the at least one input file or dependent file from the client; and
    receiving the at least one input file or dependent file from the client.

12. The method of claim 7, wherein the build request specifies at least one build parameter and wherein the step of performing the build comprises passing the at least one build parameter to the build script.

13. The method of claim 7, wherein the build request specifies a user identification and a password, the method further comprising:
    authenticating the client using the user identification and the password.

14. The method of claim 7, wherein the step of performing the build comprises invoking a build program in accordance with the build script.

15. The method of claim 14, wherein the build program comprises a compiler.

16. An apparatus, in a client, for performing a software build remotely on a server, comprising:
    means for sending, from a make utility on the client under control of a makefile script, a build request to a server, wherein the build request specifies a build script file, the build request further specifies a success condition and a success return code and wherein the build script file is executable on the server to convert a set of input files to a set of output files to form a software build;
    means for automatically receiving a build result from the server upon completion of the software build at the server;
    means for requesting at least one output file from the server in response to a successful software build;
    means for receiving the at least one file from the server; and
    means for assembling, by the make utility on the client, a software program using the at least one output file based on die makefile script.

17. The apparatus of claim 16, farther comprising means for sending the build script file to the server in response to a request for the build script file being received from the server.

18. The apparatus of claim 16, wherein the build script file is stored at the server.

19. The apparatus of claim 16, wherein the build request specifics at least one input file or dependent file, the apparatus further comprising means for sending the at least one input file or dependent file to the server in response to a request for the at least one input file or dependent file being received from the server.

20. The method of claim 16, wherein the build result indicates whether the software build is successful based on the success condition and the success return code.

21. The apparatus of claim 16, wherein the build request specifies a user identification and a password, the apparatus further comprising:
    means for authenticating with the server using the user identification and the password.

22. An apparatus, in a server, for performing a synchronous build, comprising:
 means for receiving a build request from a client, wherein the build request specifies a build script file and wherein the build request specifies a success condition and a success return code;
 build means for performing the build according to the build script file;
 means for generating a build result based on the success condition and the success return code upon completion of the build;
 means for generating at least one output file if the build is successful;
 means for automatically sending the build result to the client; and
 means for sending the at least one output file to the client in response to a request for the at least one output file being received, from the client.

23. The apparatus of claim 22, wherein the first receipt means comprises:
 means for listening to a communication port for a build request; and
 means for receiving to build request through the communication port.

24. The apparatus of claim 22, wherein the build script file resides on the client the apparatus further comprising:
 means for requesting the build script file from the client; and
 means for receiving the build script file from the client.

25. The apparatus of claim 22, wherein the build script file resides on the server.

26. The apparatus of claim 22, wherein the build request specifies at least one input file or dependent file, the apparatus further comprising:
 means for requesting to at least one input file or dependent file from the client; and
 means for receiving the at least one input file or dependent file from the client.

27. The apparatus of claim 22, wherein the build request specifies at least one build parameter and wherein the build means comprises means for passing to at least one build parameter to the build script.

28. The apparatus of claim 22, wherein the Wild request specifies a user identification and a password, the apparatus further comprising:
 means for authenticating the client using the user identification and the password.

29. The apparatus of claim 22, wherein the build means comprises means for invoking a build program in accordance with the build script.

30. The apparatus of claim 29, wherein the build program comprises a compiler.

31. A computer program product, in a computer readable medium, for performing a software build remotely on a server from a client comprising:
 instructions for sending, from a make utility on the client, under control of a makefile script, a build request to a server, wherein the build request specifies a build script file and wherein the build script file is executable at the server to convert a set of input files to a set of output files to form a software build;
 instructions for automatically receiving a build result from the server upon completion of the software build an the server;
 instructions for requesting at least one output file from the server in response to a successful software build;
 instructions for receiving at least one output file from the server; and
 instructions for assembling, by the make utility on the client a program using the at least one output file based on the makefile script.

32. A computer program product, in a computer readable medium, for performing a synchronous build in a server, comprising:
 instructions for receiving a build request from a client, wherein the build request specifies a build script file and wherein the build request specifies a success condition and a success return code;
 instructions for performing the build according to the build script file;
 instructions for generating a build result based on the success condition and the success return code upon completion of the build;
 instructions for generating at least one output file if the build is successful;
 instructions for automatically sending build result to the client and
 instructions for sending the at least one output file to the client in response to a request for the at least one output file being received from the client.

* * * * *